Figure 1:
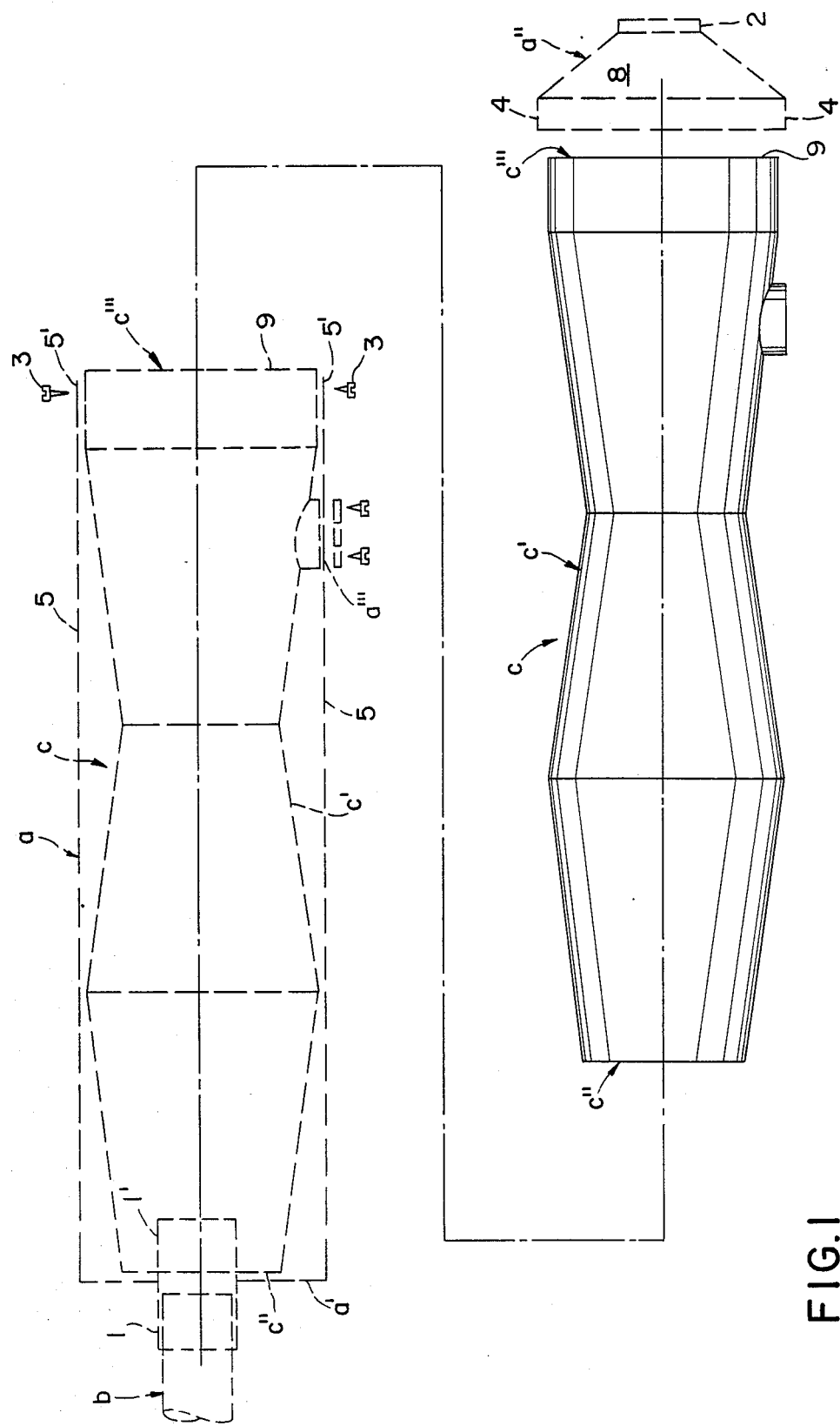

United States Patent [19]

Furlan

[11] Patent Number: 4,896,503
[45] Date of Patent: Jan. 30, 1990

[54] MUFFLING AND PURIFYING DEVICE FOR COMBUSTION GASES OF GENERAL APPLICATION

[75] Inventor: Alex B. Furlan, Buenos Aires, Argentina

[73] Assignee: Alexandrex, Inc., Chicago, Ill.

[21] Appl. No.: 272,093

[22] Filed: Nov. 16, 1988

[30] Foreign Application Priority Data

Nov. 19, 1987 [AR] Argentina .............................. 309344

[51] Int. Cl.$^4$ ................................................ F01N 3/02
[52] U.S. Cl. ........................................ 60/311; 55/291; 55/319; 55/323; 55/485; 55/DIG. 30; 60/295
[58] Field of Search ................................. 60/295, 311; 55/DIG. 30, 291, 319, 323, 485

[56] References Cited

U.S. PATENT DOCUMENTS

| | | | |
|---|---|---|---|
| 3,556,735 | 1/1971 | Epelman | 181/231 |
| 4,032,310 | 6/1977 | Ignoffo | 55/319 |
| 4,361,423 | 11/1982 | Nitz | 55/319 |
| 4,458,779 | 7/1984 | Johansson | 181/252 |
| 4,578,091 | 3/1986 | Borja | 60/311 |

*Primary Examiner*—Douglas Hart
*Attorney, Agent, or Firm*—Raiford A. Blackstone

[57] ABSTRACT

A muffler purifying device for combustion gases of general application including an expanded external casing having anterior and posterior end intakes equipped with nozzles, one connected to the exhaust pipe and the other for discharging gases, between which is included a unit of elements for retaining impurities and purifying the gases in the form of a cartridge which is removable from the external casing through an aperture located at the posterior end, equipped with a removable cover. The removable cartridge has a tubular wall with its own anterior end intake having an aperture defining an internal nozzle into which the exhaust pipe extends. The removable cartridge further comprising a first chamber for expansion and distribution of gases onto a first filtering partition made up of a packet of spread metallic disks held between perforated caps, a second chamber for the concentration and acceleration of gases having an annular blocking screen located therein projecting in the direction of the first partition and defining a sub-chamber for the expansion and distribution of gases on a second filtering partition. The second filtering partition is formed of a ceramic piece with narrow longitudinal perforations thereby providing a restricting passage for gases which discharge from the second filtering partition into an acceleration chamber of a "Venturi" piping. The "Venturi" piping also has a high velocity section into which ends a suction nozzle which communicates with outside air. The "Venturi" piping ends in a chamber for expansion and distribution of gases onto a third filtering partition, likewise formed by a ceramic piece with narrow longitudinal perforations providing a restricting passage for gases which discharge into a predischarge chamber in the external casing between the third filtering partition and the removable cover of the casing.

4 Claims, 3 Drawing Sheets

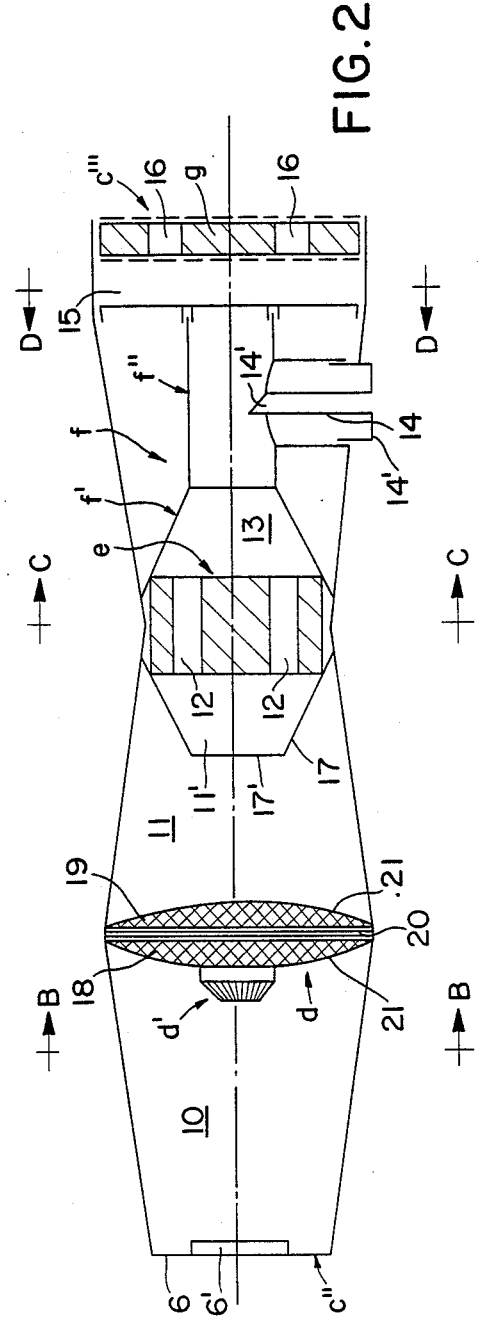

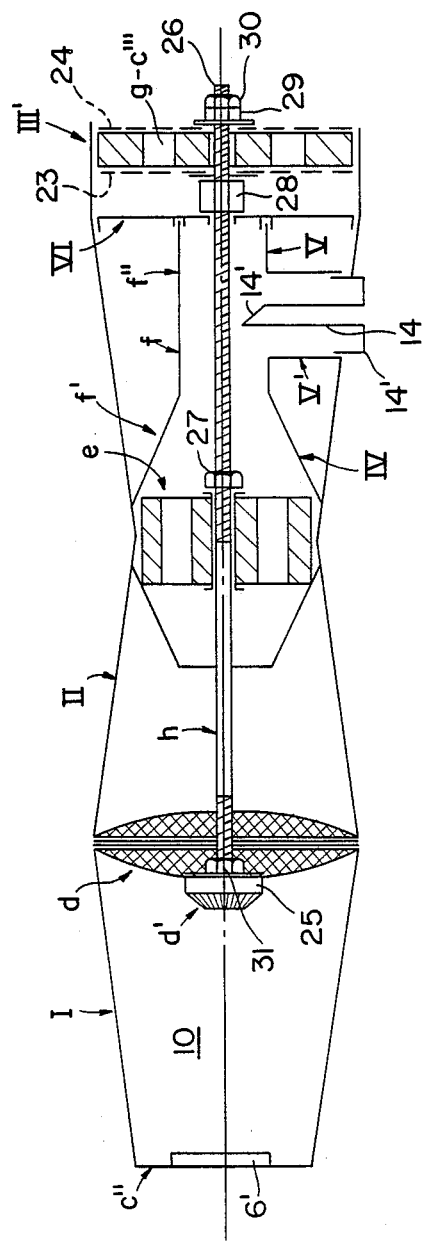
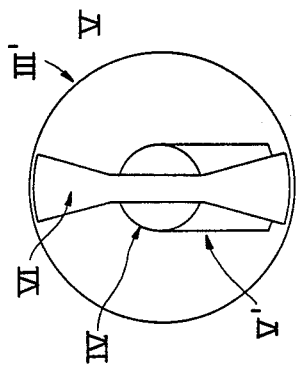
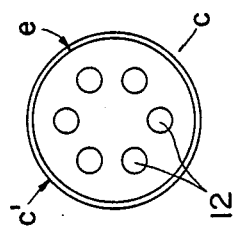
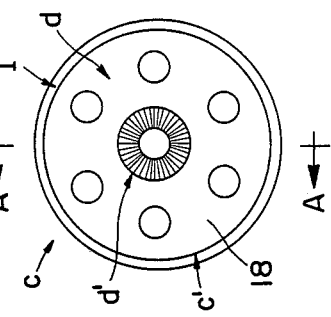
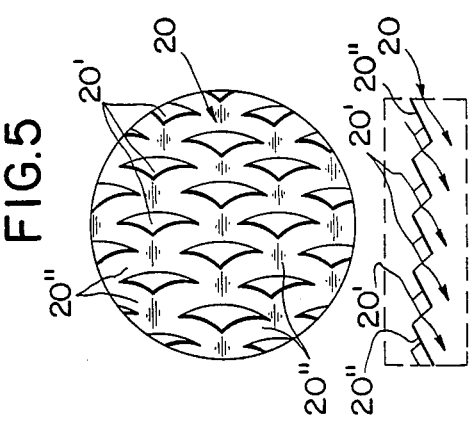

MUFFLING AND PURIFYING DEVICE FOR COMBUSTION GASES OF GENERAL APPLICATION

The present invention concerns a muffling and purifying device for combustion gases, of general application, preferably for the exhaust pipe of internal combustion engines.

The problems of health and hygiene deriving from the environmental pollution caused by the combustion gases which are put into the atmosphere from various sources, particularly those arising from the operation of automobiles, are already well known.

Various solutions have been proposed regarding the exhaust gases from vehicles, but none of these has yet afforded any real and effective retention of the carbonaceous impurities, which are more or less solid, and which are issued to the atmosphere in the form of soot. No practical solution has been found yet to reduce the huge amounts of carbon monoxide derived from the generally imperfect combustion of the usual liquid fuels: diesel and gasoline.

It should be noted that most of the proposed devices, even when they reach a certain level of efficiency as to what concerns the retention of soot, over time generate problems in the normal operation of the engine by placing excessive restrictions on the exit of the exhaust gases.

On the other hand, developments until now have been limited to the case of exhaust gases from the engines, and have no practical application in the case of other generating sources of combustion gases which bear impurities and carbon monoxide, as in the case of heat generators for various uses which operate on liquid fuel.

Consequently, the principal and basic purpose pursued by this invention consists in obtaining a very simple device which makes it possible to obtain, on the one hand, an effective retention of nearly one hundred percent of the carbonaceous impurities, and, on the other hand, a quasi-total reduction of the carbon monoxide, without placing any restriction on the normal conditions of the engine, with all of this in such a form that the retention and purification elements which are so used can be operationally connected in the form of a compact and easy-to-handle cartridge, which can be applied as an insertable/removable unit within an external casing generally connected to the exhaust pipe for the combustion gases, in such a manner that, by the simple removal of a cover, it is possible to remove it in order to replace it with another one, or, if necessary, carry out a disassembly for the purpose of cleaning and repairs, and then reinstall it in the said casing.

It is of interest, in accordance with what has been said above, that the said cartridge can be constructed in the form of a discardable sealed unit or a unit which can be disassembled entirely, with such characteristics that the average user can carry out its disassembly, cleaning, possible replacement of the parts, and then reinstall it in its support casing which is connected with the exhaust pipe.

By these means, it is possible to ensure by means of this device that it operates, for example, like the usual engine air filters, in such a manner that the average user of the vehicle is able to maintain the muffler/purifier of his vehicle in perfect operating condition, not only as regards the muffler, but rather, and very specially, as regards its even more essential function of preventing the operation of the engine of the vehicle from contributing to environmental pollution.

All these requirements, as well as others which will be stated further on hereinunder, have been fulfilled in a practical form with the device which constitutes the object of this invention, which, for the purpose of its better understanding, has been illustrated in the various diagrams, in accordance with one of its preferred forms of execution, which is presented by way of example as follows:

FIG. 1: a semi-schematic view showing the general arrangement of the device and the complementary casing for its application to the exhaust pipe for its combustion gases;

FIG. 2: a semi-schematic view in a longitudinal section A-A of the cartridge which results from the joining of the elements for retaining the impurities and for purifying the gases in the form of a solid unit which is completely compact;

FIG. 3: the same view of the previous figure, but in a cut-away view;

FIG. 4: the same view as in FIG. 2, showing how said elements are integrated as a whole in order to attain a disassemblable cartridge;

FIGS. 5 and 5, both views, one as a ground plan and one as a cross-section, of one of the integrating disks of the first filtering partition;

FIGS. 6, 7 and 8: views in transversal section, B-B, C-C, and D-D, respectively.

In accordance with what is demonstrated in the stated diagrams, the muffler and purifier of combustion gases of general application, preferably for internal combustion engine vehicles, which constitutes the object of this invention, has been developed on the basis of a regular general position of this type of devices, in accordance with which the muffler includes an extended external casing (a) with both the anterior (a') and posterior (a") end intakes, provided with two nozzles, one (1) for connection to the exhaust pipe (b), and the other (2) or the discharge of gases to the exterior, respectively and which has a spacious interior hollow which accommodates an assemblage of elements for muffling noise, retaining impurities, and purifying the gases.

In accordance with this invention, the stated elements are connected, constituting a common unit in the form of a cartridge (c) which can be inserted/removed inside said casing, through a wide access aperture, which is preferably formed by the whole posterior end (a"), which is constituted by a separate unit which provides for the said nozzle (2) of the gas outlet, and is positioned as a cover which is held in a removable manner by means of screws (3) applied through a marginal flap (4) which surrounds externally the respective peripheral portion of the posterior end (5') of the lateral wall (5) of said casing while operating as well as a containing element for the cartridge (c) in the operative position within the same, as will be further explained in the following.

This cartridge (c) consists of its own encasing tubular wall (c') which has its own anterior end intake (c") formed by a partition (6) with a central aperture (6') which is connected above an internal protrusion (1') of the same anterior end intake (a') of the said external casing, which is adapted by means of an extension within the latter, with the said nozzle (1) for connection to the exhaust pipe to thus ensure that the gases pass directly from this pipe to the interior of the cartridge, the stated tubular wall (c') of which has, on its posterior end, a rear part (c''') by means of which a restricted passage of gases through it is ensured from the interior of the cartridge to an expansion chamber (8) of the same, prior to its discharge to the outside, through the nozzle (2) of the said intake cover (a'') of the external casing (a), positioned within this last, between the posterior front (9) of the rear part and the concavity of this cover, due to the truncated conical structure which it has.

The interior of the cartridge (c) has, as a continuation of said connection with the nozzle (1) intake for the gases, a chamber (10) for expansion and deflection of the gases against a filtering partition (d) which has a front with a deflector cone (d') which is directed toward said central aperture (6,) of the anterior end intake in such a manner as to distribute the stream of gases projected by the internal nozzle (1) above the entire frontal surface of the partition.

This first filtering partition (d) includes the entire transversal section of the tubular wall of the cartridge in a maximum diameter section of the same, and, on the other side of which, there extends a chamber (11) for concentrating and accelerating the gases, with a restricting passage for the same, proportioned by the respective perforations (12) of a second filtering partition (e) located in a pronounced narrowing of the said wall.

Behind this second partition (considering the direction of circulation of the gases), there extends the acceleration chamber (13) of a central piping (f), which, by way of "Venturi" devices, includes a substantial cylindrical section (f'), in which the nozzle (14') of the lateral outlet (14) allows the intake of fresh air from the exterior, by extending transversely to the wall of the cartridge and, through the same, opens onto an external air intake (a''') of said external casing (a) of the device.

This central piping (f) discharges into a chamber (15) for expansion and reaction of the mixture of gases and fresh air, in which the transversal section of the tubular wall (c') of the cartridge (c) reaches its greatest diameter, which corresponds to the stated rear part (c'''), which is located in immediate continuation of this chamber, sealing this end of the wall and is constituted by a third filtering partition (g) which determines, by means of the perforations (16), the restricted passage of gases to the stated predischarge chamber (8) for the discharge of the same to the outside, which is formed, as already indicated, between this rear part and the respective cover, which adapts the posterior end intake (a'') of the casing with its exit nozzle (2) for the same.

There is included a stoppage screen (17), which deflects the mass of the gas which circulates within a posterior (11) chamber to the filtering partition (d), coming from this latter, and formed by a conical unit on the interior of the lateral wall (c') of the cartridge, which projects from larger to smaller to this latter thin partition and ends in aperture (17') with a diameter which is proportionately reduced, less than that of the second filtering thin partition (e) in such a form that its presence creates a zone of turbulence which forces the gas to follow a sinuous trajectory in order to reach this second partition, at which this screen is faced by the concavity resulting from the said conformation, which constitutes something of a sub-chamber (11') for the expansion of the gas within this chamber (11) for acceleration and concentration of the same, facing this partition.

The said first filtering partition (d) is constituted by two spherical flat caps (18 & 19) with multiply-perforated wall, facing on their concave side, bonding between the two a packet of various multiply perforated disks (20) which are essentially flat, juxtaposed between them, made of laminal metal spread in reduced thickness, and positioned with the apertures determined by the respective displaced cuts between them.

As is well known, a piece of spread laminal material presents extended apertures (20') included between strips (20'') of material, which extend to form these apertures at the base of the cuts in the piece unit, and have a certain obliqueness which makes the same protrude on one side and the other of the disk, which creates surfaces of marked roughness on one side and the other.

Subsequent to juxtaposing two or more disks (20) of this spread metal, said strips act as spacing projections and cause a certain strict separation between the same, and said separation between each one of the disks forms a very tight but wide chamber, with an extension equal to that of the disks, and each one of these narrow chambers communicates through the open cuts of the disks with an equal chamber or chambers adjacent to them constituted in the same manner, which creates an intricate passage which is extremely convoluted for the gases, through the packet of disks, which allows there to be obtained an effective retention of solid particles, which is helped to the highest degree by the roughness of the same.

There furthermore contribute to this retention the masses of fine metallic fabric (21) located in the concavity of both caps and which cover both faces of the packet of disks, with this mass being arranged in such a way that it encases in its periphery the packet of disks.

Both the second as well as the third filtering partitions (e and g) are composed of molded pieces of ceramic material, preferably roughly grained, in such a manner that their respective perforations (12 and 16) permit surfaces which are distinctly rough, and preferably have a certain level of porosity, which tends to cause the retention and practically a quasi-absorption of the carbonaceous particles.

Both partitions can be constructed from a single piece or from two or more pieces contiguous to one another, with their perforations coinciding between them, or with a certain degree of displacement between them; futhermore, in the event of two or more pieces, their perforations may have the same or different diameters, with the purpose of creating a certain level of turbulence which tends to facilitate the retention of the impurities.

It is further provided to provide a certain separation between each of the adjacent pieces, in such a manner as to create a chamber for abrupt expansion of the gases between them, which contributes to the obtaining of the said retention of the impurities.

The said tubular wall (e') of the cartridge (c) is indeed essentially formed by three conical sections of sheet metal, which proceed one after another, coaxially among themselves; a first anterior end section (I) includes, in one single piece on the stated intake (6) of the cartridge, on its end with smaller diameter and on the anterior cap (18) of the filtering partition (d) on its larger end, delimited by its empty interior at the chamber (10); a second intermediate section (II) includes, likewise in a single piece, the posterior cap (19) of this first partition in its larger end, and has within its end portion with smaller diameter the said conical screen (17), with its concavity faced to this last end.

Both sections are joined among themselves by the periphery of both caps.

The third end section (III) joins at its smaller end with the same end of the second and accommodates in its interior with the "Venturi" piping formed by a single piece separate from it, and composed by a truncated conical section (IV) which, on its larger edge, joins with the wall of this intermediate section (III), with its concavity faced by the second filtering partition (e) and at its smaller end joins a supplemental cylindrical section (V), which has a lateral branch (V') with the fresh air intake nozzle (14), and ends in an end (22) by which it joins with the intermediate part of a support cross-piece (VI) which is centered by this piping within the said end section (III) which is extended diametrically within the large end of the latter, which has, at this same end, a cylindrical extension (III') which limits the chamber (15) and accommodates the fourth filtering partition (g) which conforms to the rear part (c''') of the cartridge.

The constructive piece of the second filtering partition (e) essentially adjusts within the joint between the sections (II and III) and is axially enclosed between the screen (17) of the first gear and the section (IV) of the "Venturi" piping (f).

The constructive piece of the third filtering partition (g) and the rear part (c''') of the cartridge adjusts with its periphery within the extension (III') of the third section (III), and is conducted axially between the two multiply perforated disks: the anterior disk (23) spaced from the end (22) of section (V) of the "Venturi" piping, and the rear one (24) which is joined to said tubular wall of the cartridge.

Within the scope of this invention, it is provided to construct the cartridge in the form of a sealed unit, which is disposable in which the stated assembly of elements are connected by means of direct union, by means of welding, for example, between the stated component sections, through the stated joints between the same: the first and second sections (I and II) are joined by the periphery of the caps (18 and 19) of the first filtering partition (d) bonding among them the packet of multiply perforated disks (20) and its cover of metallic fabric (21); the section (IV) of the "Venturi" piping is fixed internally to the wall of section (III) and its section (V) to the crosspiece (VI), the ends of which are likewise joined to this latter; the second filtering partition is placed through the smaller ends of the second and third section which are joined and bound among themselves, with this partition bound axially between the screen and said section (IV); the anterior disk (23) joins internally, through its periphery, the extension (III') of section (III) and the posterior disk (24) on the edge of this extension bonding among them the third filtering partition (g) which constitutes the rear part of the cartridge.

It has, however, been provided that the cartridge be constructed in the form of a unit which can be disassembled, in such a manner that it is possible to clean and/or replace the component elements and to change, reassemble and reinstall it within the said external casing (a).

In this case, there is no direct union between the said sections (IV-IV-V), which constitute the "Venturi" piping (f), but this latter is rather not joined by the edge of its section (IV) to the interior of the third section (III), as in the first case, and to the cross-piece (VI), which, for its part, is not connected to this section, nor are they the multiperforated disks (23 & 24) between which the third filtering partition (g) and rear part (c''') are positioned.

The separate elements of the assembly are connected among themselves by means of a reinforced rod (h) which is coiled down its entire length, which has an end head (25) which conforms to the said deflector cone (d') of the first filtering partition (d).

This rod is positioned through the mouth (6') of the end intake (c'') of the first section (I) and extends to the interior of the assembly, passing through the first partition (d), the second section (II), the second partition (e), the "Venturi" piping (f), the cross-piece (VI), the anterior disk (23), the third filtering partition (c'''), and the posterior disk (24) protruding relative to this last by its end portion (26), which faces the exit nozzle (2) of the end posterior intake cover (a'') of the external casing of the device.

The bonding of the separate elements described is obtained by means of the head (25) of the rod and three auxiliary nuts, in the following manner:

The head (25) and a first nut (27) bond among themselves the component elements of the first partition (e) between both multiply perforated caps (18 and 19) of the same, fixed to the first and second section, at the time they bond the second partition (e) against the internal screen of this second section, determining the bonding between both sections; a second nut (28) presses against the cross-piece (VI) and presses it by its ends within the third section (III) with which it presses against the second at the time that it is squeezed against the "Venturi" piping unit (f), adjusting it to the edge of its section (IV) against the interior of the external part with smaller diameter than the third section (III), around the second filtering partition (e).

This second nut (28) acts as a spacing unit between the said cross-piece (VI) and the anterior disk (23) of the third filtering partition (g), which, connected with its posterior disk (24), is bonded against this second nut, with the third nut (29) on which a counter-nut or the like (30) prevents the generally strong vibrations from the muffler from loosening the unit.

There is provided a fourth nut (31), which is applied behind the anterior cap (18) to bind this against the cap (25) in such a way as to ensure that the rod (h) is fixed to this cap and, with it, to the section (I).

It is furthermore evident that, with the progressive withdrawal of said nuts, it is possible to disassemble the entire unit and to reassemble it easily.

The device described acts in the following manner: the stream of gases which project from the internal nozzle (7) of the casing (a), through the external intake (c') of the cartridge, within the chamber (10), expand, and is distributed by the deflector cone (d') over the entire surface of the front cap (18) of the first filtering partition (d), through the apertures of which penetrate through the same, where they cause an intricate path through the mass of metallic fabric (21) and of the packet of spread metallic disks (20), which determines the retention of practically the greater part of the mass of carbonaceous particles and soot carried by the gas, which comes to the chamber (11) where it concentrates and accelerates to impact against the screen (17) which deflects the gas, thus causing a strong turbulence which contributes to the retention of solid particles and sets a simusoid path, which accelerates the gas to pass through the aperture (17'), which communicates with the expansion sub-chamber (11') in front of the second filtering partition (e) where the gas is forced through it at a great velocity caused by the reduced size of the perforations (12), producing a sharp heating and retention of impurity caused by the surface roughness of these perforations, from which the gas arrives to the concentration and acceleration chamber (13) part of the "Venturi" piping (f), at a high velocity, producing a strong suction in the nozzle (14') of the aperture (14), which causes the entrance of a continuous and stong stream of fresh external air through the latter, which is rich in oxygen, and which mixes closely with the gases, expanding in the chamber (15), with a strong reaction producing the reduction of the carbon monoxide.

The gas thus purified is forced through the perforations (16) of the third filtering partition (g), where there is obtained the retention of any remaining impurity, in order to finally expand in the predischarge chamber (8) and concentrate again with a rapid acceleration in the respective nozzle (2) of the posterior end intake cover (a") of the external casing (a) which projects it outwardly.

Furthermore, the stated lateral branch (V') of the Venturi piping (f) ends in an end partition through which it passes, and is fixed centrally at the posterior end of direct connection of the nozzle (14) with the outside, which is placed even with an opening in the lateral wall (5) of the external casing (a), on which a small cap (27) is placed; this has an aperture for communication through this nozzle, and is held down in a removable manner by means of screws (28) which are screwed into the said partition which is thus set at the periphery of the said mouth of the wall of the casing against this end of the said lateral branch (V') of the piping, keeping open the communication of the nozzle (14) with the outside.

It is undoubtable that this invention, if brought to practice, would be able to introduce certain modifications, in which certain details of form and construction of the device for muffling and purifying of combustion gases appear, which are referred to in this statement of the invention but which, however, do not limit the fundamental principles which are clearly specified in the claims which follow hereinafter.

Having specifically described and determined the nature and scope of the present invention and the manner in which the same is brought into practice, ownership and exclusive rights to this invention are hereby claimed as follows:

1. A muffler and purifying device for combustion gases, of general application, of a type which includes an expanded external casing with two end intakes, anterior and posterior, equipped with nozzles, one connected to the exhaust pipe and the other for the discharge of gases to the outside, respectively, between which there is included a unit of elements for retaining impurities and purifying the gases, the improvement comprising said elements being connected in the form of a cartridge which is removable from the casing through an aperture located at said posterior end, said aperture being closable by means of a removable cover said cartridge having a tubular wall with its own anterior end intake which has an aperture defining an internal nozzle for connection with the exhaust pipe which extends through said anterior end nozzle, said cartridge further comprising a first chamber for expansion and distribution of gases on a first filtering partition including perforated caps and a packet of spread metallic disks, a second chamber for the concentration and acceleration of gases, in which is located an annular blocking screen projecting in the direction of said first partition and defining a sub-chamber for the expansion and distribution of gases on a second filtering partition, formed by a ceramic piece with narrow longitudinal perforations, which provide a restricting passage for gases which discharge into an acceleration chamber of a "Venturi" piping, said "Venturi" piping also having a high velocity section into which ends a suction nozzle which communicates with the outside air, said "Venturi" piping ending in a chamber for expansion and distribution of gases on a third filtering partition, likewise formed by a ceramic piece with narrow longitudinal perforations, which cause a restricting passage for the gases and discharge said gases into a predischarge chamber of said external casing, formed between said third filtering partition which is incorporated in the cartridge as an end posterior rear part of its tubular wall, and said removable cover which seals the posterior end of the casing.

2. A muffler and purifying device for combustion gases of general applications in accordance with claim 1, wherein said tubular wall of the cartridge includes a series of sheet metal sections, comprising an anterior end section, which is formed from one piece of sheet metal extending from said cartridge intake to said first filtering partition; an intermediate section formed from one piece of sheet metal extending from said first filtering partition to said second filtering partition; and a posterior end section which accommodates the said "Venturi" piping which is centered within said posterior end section by means of an internal cross-piece joined to said high velocity section of said "Venturi" piping, said cross-piece having an extension which accommodates the third filtering partition.

3. A muffler and purifying device for combustion gases of general application, in accordance with claim 2, wherein said sections of the tubular cartridge wall, said "Venturi" piping, said cross-piece, and the filtering partitions are united among themselves a sealed unit.

4. A muffler and purifying device for combustion gases of general application, in accordance with claim 2, wherein said sections of the tubular cartridges wall, said "Venturi" piping, said cross-piece, and said filtering partitions are connected in a removable manner among themselves, thereby forming a unit which can be disassembled, said means of connection being a coiled rod centrally extending lengthwise in the unit, and having an anterior end head which projects forward from the first filtering partition and forms a deflector cone, and a succession of three nuts mounted thereon, a first nut adjustably mounted behind the second partition, a second nut adjustably mounted behind the cross-piece and positioned by way of a spacing unit located between said second nut and the third partition and a third nut adjustably mounted on said coiled rod behind said third filtering partition.

* * * * *